United States Patent
Cho et al.

(10) Patent No.: US 10,615,907 B2
(45) Date of Patent: *Apr. 7, 2020

(54) RATE ADAPTATION METHOD USING BIT ERROR RATE FOR MULTIMEDIA SERVICE AND APPARATUS THEREFOR

(71) Applicant: Electronics and Telecommunications Research Institute, Daejeon (KR)

(72) Inventors: Yong Ju Cho, Seoul (KR); Ji Hun Cha, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/206,550

(22) Filed: Nov. 30, 2018

(65) Prior Publication Data

US 2019/0097752 A1    Mar. 28, 2019

Related U.S. Application Data

(63) Continuation of application No. 15/349,709, filed on Nov. 11, 2016, now Pat. No. 10,181,928, which is a
(Continued)

(30) Foreign Application Priority Data

| Jun. 11, 2012 | (KR) | 10-2012-0062312 |
| Jul. 6, 2012 | (KR) | 10-2012-0073678 |
| Sep. 13, 2012 | (KR) | 10-2012-0101468 |
| Sep. 19, 2012 | (KR) | 10-2012-0103995 |
| Jun. 11, 2013 | (KR) | 10-2013-0066484 |

(51) Int. Cl.
*H04L 1/00* (2006.01)
*H04L 1/20* (2006.01)

(52) U.S. Cl.
CPC .......... *H04L 1/0011* (2013.01); *H04L 1/0002* (2013.01); *H04L 1/0009* (2013.01);
(Continued)

(58) Field of Classification Search
None
See application file for complete search history.

(56) References Cited

U.S. PATENT DOCUMENTS

| 2003/0097623 A1* | 5/2003 | Razavilar | H04L 1/0016 714/704 |
| 2007/0033496 A1* | 2/2007 | Cooklev | H04L 1/0017 714/776 |

(Continued)

FOREIGN PATENT DOCUMENTS

| JP | 2010518653 A | 5/2010 |
| JP | 2010187127 A | 8/2010 |

(Continued)

*Primary Examiner* — Brian S Roberts
(74) *Attorney, Agent, or Firm* — William Park & Associates Ltd.

(57) ABSTRACT

Rate adaptation is carried out using bit error rate (BER) to enable effective multimedia transmission. The BER can be estimated using signal strength in a MAC layer and modulation information (FIGS. 7-9), and can be compatibly used in different wireless networks by means of message standardization.

10 Claims, 11 Drawing Sheets

Related U.S. Application Data continuation of application No. 14/391,071, filed as application No. PCT/KR2013/005134 on Jun. 11, 2013, now Pat. No. 9,509,439.

(52) U.S. Cl.
CPC .......... *H04L 1/0014* (2013.01); *H04L 1/0033* (2013.01); *H04L 1/0041* (2013.01); *H04L 1/203* (2013.01)

(56) References Cited

U.S. PATENT DOCUMENTS

| | | |
|---|---|---|
| 2011/0199906 A1 | 8/2011 | Kanode et al. |
| 2013/0114482 A1* | 5/2013 | Oh ..................... H04L 12/6418 370/310 |

FOREIGN PATENT DOCUMENTS

| | | |
|---|---|---|
| KR | 1020090055899 A | 6/2009 |
| KR | 1020090128311 A | 12/2009 |
| KR | 1020110121740 A | 11/2011 |
| KR | 1020120056271 A | 6/2012 |

\* cited by examiner (a) BER vs. SNR (802.11a)

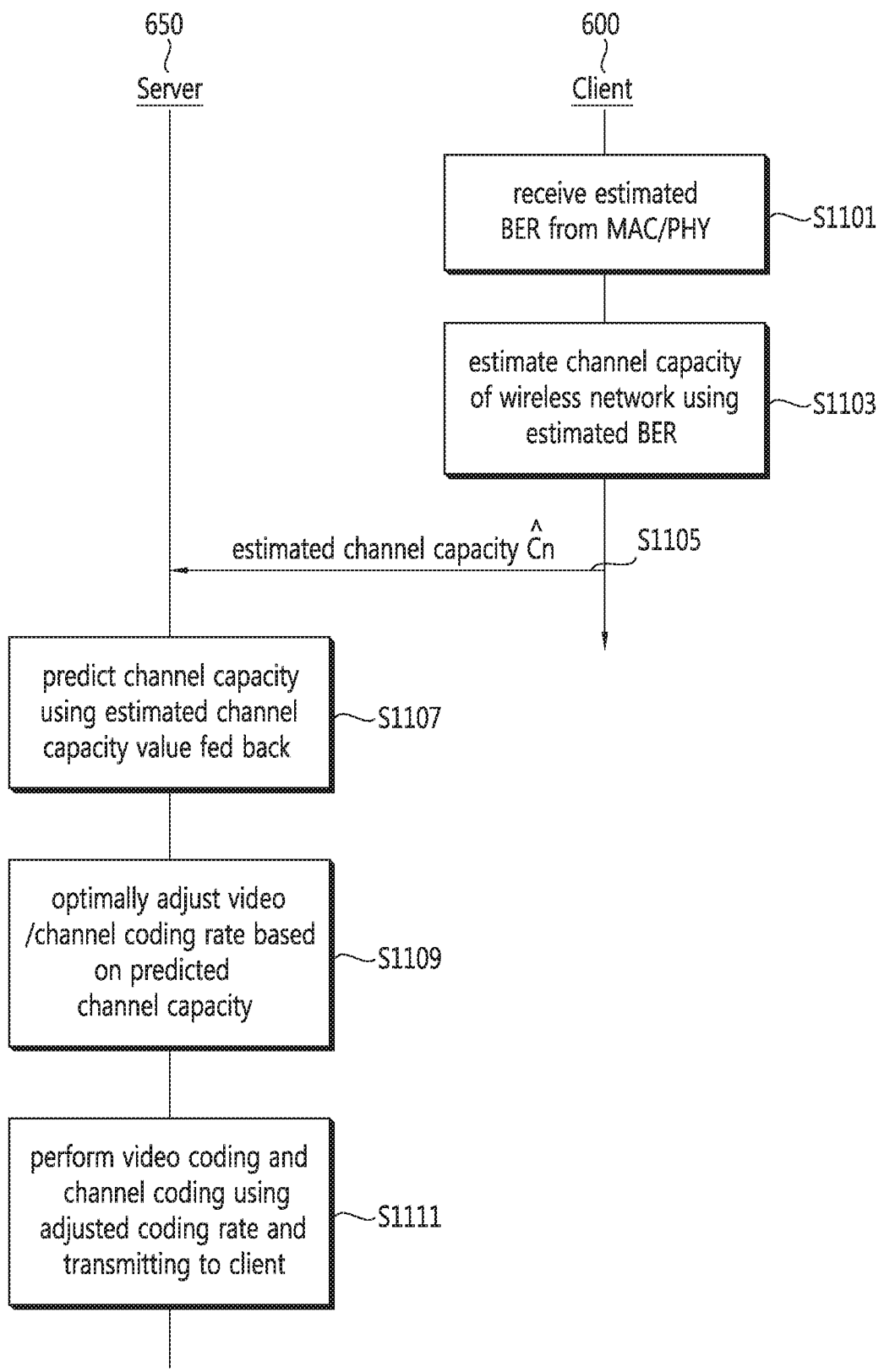

RATE ADAPTATION METHOD USING BIT ERROR RATE FOR MULTIMEDIA SERVICE AND APPARATUS THEREFOR

CROSS-REFERENCES TO RELATED APPLICATIONS

The present application is a continuation application of U.S. application Ser. No. 15/349,709, filed on Nov. 11, 2016, which is a continuation application of U.S. application Ser. No. 14/391,071, filed on Oct. 7, 2014, and the present application claims priority under 35 U.S.C. § 119(a) to KPA No. 10-2012-0062312 filed on Jun. 11, 2012, No. 10-2012-0073678 filed on Jul. 6, 2012, No. 10-2012-0101468 filed on Sep. 13, 2012, No. 10-2012-0103995 filed on Sep. 19, 2012, No. 10-2013-0066484 filed on Jun. 11, 2013, as referred to the original application and PCT/KR2013/005134, which is incorporated herein by reference in its entirety.

TECHNICAL FIELD

The present invention relates to a multimedia transmission method, and more specifically, to an effective multimedia transmission method and apparatus using a bit error rate.

BACKGROUND ART

Weak signal strength causes a lot of bit errors and packet losses in the wireless environment. To address these problems associated with real-time video transmission, rate control using forward error correction (FEC) has been introduced.

Reducing packet loss in the wireless environment requires estimation of the link quality or channel condition. In particular, for the purpose of real-time video transmission, wireless channel capacity needs to be correctly estimated in real time. This is why the wireless link conditions and link quality may vary with interference, fading, multi-path effects, and mobility, and such variations may lead to a significant change in channel capacity.

In other words, the exact estimation or prediction of a wireless channel condition is critical in configuring a proper channel coding rate in order to provide enhanced video quality upon real-time video transmission.

For example, when a multimedia content stream is viewed that is transmitted through a WLAN (IEEE 802.11b) installed in the office, a channel environment may be affected by, e.g., interference caused by an access point (AP) positioned in another office, thus causing a significant distortion of the multimedia content stream.

To estimate link quality or channel condition, the wireless LAN protocol that discards packets having one or more remaining errors (MAC layer errors) has been conventionally used. In this scheme, the link quality or channel capacity is estimated using the packet error rate (PER).

Such a conventional art predicts the link quality or channel capacity using the packet error rate (PER), but not bit error rate (BER), so it suffers from low prediction accuracy and resultantly poor channel adaptivity, thus failing to guarantee desired wireless video quality.

DISCLOSURE

Technical Problem

An object of the present invention is to provide an effective multimedia transmission method using a bit error rate.

Technical Solution

To address the above-described problems, according to an embodiment of the present invention, a method of receiving multimedia comprises generating a message including an indicator indicating a layer where a bit error rate is generated among a plurality of different layers including at least one of a physical (PHY) layer and an MAC (Media Access Control) layer.

The bit error rate may be estimated using side information in a plurality of different layers including at least one of the physical (PHY) layer and the MAC (Media Access Control) layer.

The message may further include a parameter indicating the bit error rate, and the indicator indicating the layer where the bit error rate may be generated may belong to part of a parameter indicating the bit error rate.

The indicator indicating the layer where the bit error rate is generated may be positioned at the first bit of the parameter indicating the bit error rate.

The method may further comprise transmitting the indicator indicating the layer where the bit error rate is generated and the generated bit error rate to a transmitting apparatus or transmitting a channel condition to the transmitting apparatus, wherein the channel condition is generated using the indicator indicating the layer where the bit error rate is generated and the bit error rate.

The indicator indicating the layer where the bit error rate is generated may be delivered between layers of a receiving apparatus through a cross layer interface (CLI).

To address the above-described problems, a method of transmitting multimedia comprises receiving a message including an indicator indicating a layer where a bit error rate is generated among a plurality of different layers including at least one of a physical (PHY) layer and an MAC (Media Access Control) layer.

The bit error rate may be estimated and generated using side information in the plurality of different layers including at least one of the PHY layer and the MAC layer.

The method may further comprise receiving a media fragment unit (MFU) having a format independent from a specific media codec from a media codec layer; generating a media processing unit (MPU) using the media fragment unit (MFU); generating an MMT asset by encapsulating the generated media processing unit (MPU); generating an MMT package by encapsulating the generated MMT asset; receiving the generated MMT package and generating an MMT payload; and generating an MMT transmission packet using the generated MMT payload.

The method may further comprise selecting a coding rate by performing rate control on media data to be transmitted based on the bit error rate in the generated message.

The side information may include at least one of a signal strength, modulation information, and ambient wireless traffic information.

Further, to address the above-described problems, according to an embodiment of the present invention, a method of estimating a channel condition using a bit error rate comprises generating the bit error rate using side information among a plurality of different layers including at least one of a physical layer and an MAC layer and including the bit error rate and an indicator indicating a layer where the generated bit error rate is generated in a message and transmitting the message to another layer.

The bit error rate may be estimated using side information in a plurality of different layers including at least one of the physical (PHY) layer and the MAC (Media Access Control) layer.

Further, to address the above-described problems, according to an embodiment of the present invention, an apparatus of receiving multimedia comprises a BER (Bit Error Rate) generating unit generating a message including an indicator indicating a layer where a bit error rate is generated among a plurality of different layers including at least one of a physical (PHY) layer and an MAC (Media Access Control) layer.

The bit error rate may be estimated using side information in a plurality of different layers including at least one of the physical (PHY) layer and the MAC (Media Access Control) layer.

The apparatus may further comprise a channel estimating unit receiving the bit error rate and information on the layer where the bit error rate is generated from the BER generating unit and estimating a channel condition.

The message may further include a parameter indicating the bit error rate, and the indicator indicating the layer where the bit error rate is generated may belong to part of a parameter indicating the bit error rate. The channel estimating unit may transmit the estimated channel condition to a transmitting apparatus.

The indicator indicating the layer where the bit error rate is generated may be 0 when the layer where the bit error rate is generated is a physical layer.

The apparatus may further comprise a cross layer interface (CLI) of an MMT (MPEG Media Transport) system, and the cross layer interface may deliver the indicator indicating the layer where the bit error rate is generated between layers.

Further, to address the above-described problems, according to an embodiment of the present invention, an apparatus of transmitting multimedia using a bit error rate comprises a media data generating unit generating media data to be transmitted; a transmitting unit transmitting the media data generated by the media data generating unit; and a rate tuner controlling an operation of the media data generating unit according to channel information received from a receiving apparatus, wherein the channel information is a message including an indicator indicating a layer where a bit error rate is generated among a plurality of different layers of the receiving apparatus including at least one of a physical (PHY) layer and an MAC (Media Access Control) layer or channel condition information generated by the receiving apparatus using the indicator.

The bit error rate may be estimated and generated using side information in the plurality of different layers including at least one of the PHY layer and the MAC layer.

The apparatus further comprises a media fragment generating unit receiving a media fragment unit (MFU) having a format independent from a specific media codec from a media codec layer; a media processing unit generating unit generating a media processing unit (MPU) using the media fragment unit (MFU); an MMT asset generating unit generating an MMT asset by encapsulating the generated media processing unit (MPU); an MMT package generating unit generating an MMT package by encapsulating the generated MMT asset; an MMT payload generating unit receiving the generated MMT package and generating an MMT payload; and an MMT transmission packet generating unit generating an MMT transmission packet using the generated MMT payload, wherein the media data generating unit may generate the media data to be transmitted by performing channel coding on the MMT transmission packet generated by the MMT transmission packet generating unit.

The rate tuner may select a coding rate by performing rate control on the media data based on the received channel information.

The media data generating unit may generate the media data by coding a channel at the coding rate, and the transmitting unit may transmit the media data to a client.

Further, to address the above-described problems, according to an embodiment of the present invention, an apparatus of estimating a channel condition using a bit error rate comprises a BER generating unit generating the bit error rate using side information among a plurality of different layers including at least one of a physical layer and an MAC layer and a transmitting unit including the bit error rate and an indicator indicating a layer where the generated bit error rate is generated in a message and transmitting the message to another layer.

The bit error rate may be estimated and generated using side information in the plurality of different layers including at least one of the PHY layer and the MAC layer.

Advantageous Effects

Rate adaptation is performed using a BER, so that effective multimedia transmission may be achieved. The BER may be estimated using the signal strength and modulation information in the MAC layer, and it may be message-standardized to provide compatibility so that it can be used between different networks.

DESCRIPTION OF DRAWINGS

FIGS. 10 and 11 are flowcharts illustrating rate adaptation in a wireless network according to an embodiment of the present invention.

BEST MODE

Figure 1:
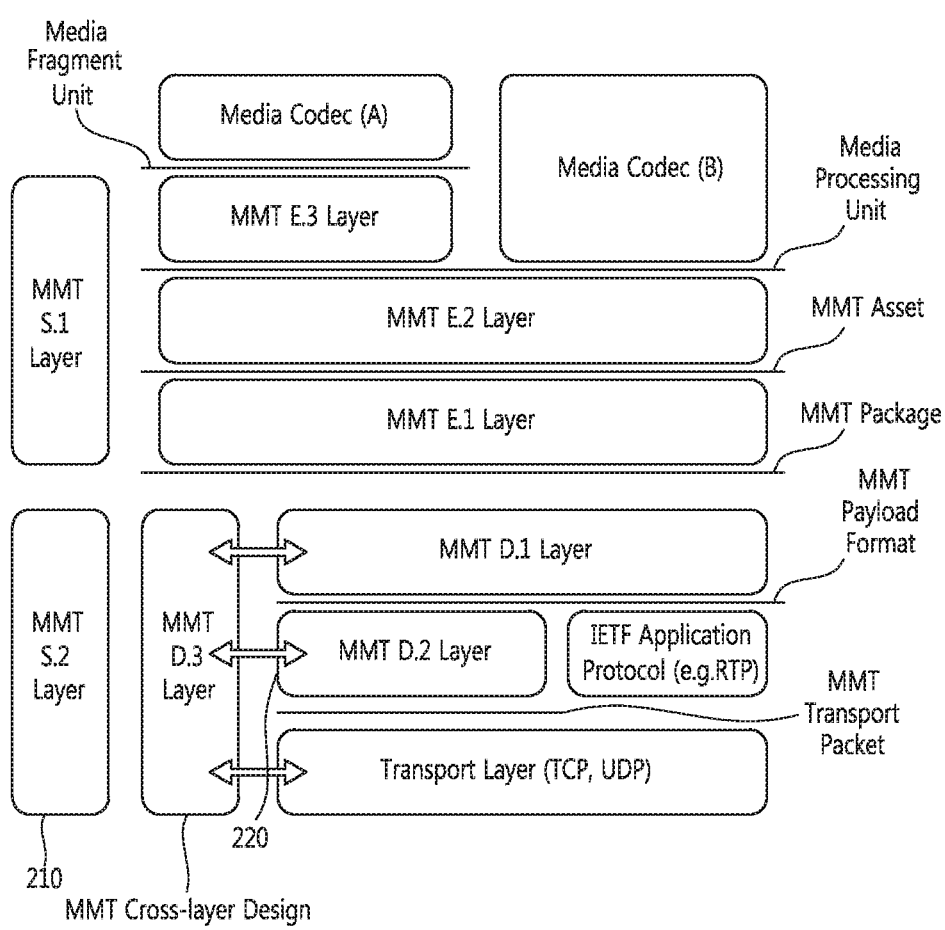
FIG. 1 is a conceptual view illustrating an MMT layer structure.

Various modifications may be made to the present invention and the present invention may have a number of embodiments. Specific embodiments are described in detail with reference to the drawings. However, the present invention is not limited to specific embodiments, and it should be understood that the present invention includes all Modifications, equivalents, or replacements that are included in the spirit and technical scope of the present invention.

The terms "first" and "second" may be used to describe various components, but the components are not limited thereto. These terms are used only to distinguish one component from another. For example, the first component may be also named the second component, and the second component may be similarly named the first component. The term "and/or" includes a combination of a plurality of related items as described herein or any one of the plurality of related items.

When a component is "connected" or "coupled" to another component, the component may be directly connected or coupled to the other component. In contrast, when a component is directly connected or coupled to another component, no component intervenes.

The terms used herein are given to describe the embodiments but not intended to limit the present invention. A singular term includes a plural term unless otherwise stated. As used herein, the terms "include" or "have" are used to indicate that there are features, numerals, steps, operations, components, parts or combinations thereof as described herein, but do not exclude the presence or possibility of addition of one or more features, numerals, steps, operations, components, parts or components thereof.

Unless defined otherwise, all the terms including technical or scientific terms as used herein have the same meanings as those generally understood by one of ordinary skill in the art. Such terms as generally defined in the dictionary should be interpreted as having meanings consistent with those understood in the context of the related technologies, and should not be construed as having excessively formal or ideal meanings unless clearly defined in the instant application.

Hereinafter, as used herein, the terms are defined as follows.

The "content component" or "media component" is defined as a single type of media or a subset of a single type of media, and may include, e.g., a video track, a movie subtitle, or an enhancement layer of a video.

The "content" is defined as a set of content components, and may include, e.g., a movie or a song.

The "hybrid delivery" is defined as one or more content components being simultaneously transmitted through one or more networks physically different from each other.

The "presentation" is defined as an operation performed by one or more devices so that a user may experience one content component or one service (for example, watching movie).

The "service" is defined as one or more content components transmitted for a presentation or storage.

The "service information" is defined as meta data describing one service, characteristics of the service, and components.

Hereinafter, the "first network" or "second network" includes various networks including a broadcast network, a broadband network, a cable network, or a satellite communication network.

Hereinafter, hybrid transmission may be performed on a per-MMT asset basis, on a per-substream basis, on a per-MMT package basis, or on a per-MMT packet basis, and in case video content consists of a plurality of layers such as a first layer and a second layer, hybrid transmission may be done on a per-layer basis.

The "access unit (AU)" is the smallest data entity that may have time information as its attribute. When encoded media data is involved that is not designated with time information for decoding and presentation, no AU is defined.

The MMT asset is a logical data medium that consists of the same MMT asset ID and at least one MPU or consists of a specific data clump together with a format defined in other standards. The MMT asset is a largest data unit that is applied with the same composition information and transmission characteristic.

The MMT asset delivery characteristic (MMT-ADC) is a description related to a QoS request for transmitting the MMT asset. The MMT-ADC is expressed not to be aware of a specific transmission environment.

The MMT composition information (MMT CI) describes a spatial and temporal relationship between MMT assets.

The media fragment unit (MFU) is a general container independent from any specific codec and accommodates encoded media data that may be independently consumable by a media decoder. The MFU has a size equal to or smaller than the access unit (AU) and accommodates information that may be used in the transmission layer.

The MMT entity is a software or hardware implementation that follows an MMT profile.

The MMT package is a collection of logically structured data and consists of at least one MMT asset, MMT-composition information, MMT-asset transmission characteristics, and descriptive information.

The MMT packet is the format of data generated or consumed by an MMT protocol.

The MMT payload format is the format for the payload of an MMT signaling message or MMT package delivered by an MMT protocol or Internet applicable layer protocol (e.g., RTP).

The MMT processing unit or media processing unit (MPU) is a general container independent from any specific media codec and accommodates at least one AU and information associated with additional transmission and consumption. For non-temporal data, the MPU accommodates data part that does not belong to the AU range. The MPU is encoded media data that may be processed completely and independently. In this sense, the "process" means encapsulation or packetization into the MMT package for transmission. However, in some cases, for scalable video coding (SVC) and multi-view video coding (MVC), the MPU may not be independently and completely consumed in the media codec server.

The non-timed data defines all data elements that are consumed with no time specified. The non-timed data may have a temporal range when data may be executed or started.

The timed data defines data elements associated with a specific time when decoding and presentation are done.

Hereinafter, preferred embodiments of the present invention will be described in detail with reference to the accompanying drawings. For better understanding of the present invention, the same reference denotations are used to refer to the same elements throughout the drawings, and repetitive description of the same elements is skipped.

FIG. 1 is a conceptual view illustrating an MMT layer structure.

Referring to FIG. 1, the MMT layer includes an encapsulation layer, a delivery layer, and a functional area of a signaling layer (S layer). The MMT layer operates over a transport layer.

The encapsulation layer (E-layer) may be in charge of functions such as, for example, packetization, fragmentation, synchronization, and multiplexing of transmitted media.

The encapsulation functional area defines the logical structure of the format of data units that are processed by a medium observing MMT, an MMT package, and media content. In order to provide information necessary for adaptive transmission, the MMT package specifies components including media content and the relationship therebetween. The format of the data units is defined to encapsulate encoded media so as to be stored or transmitted by the payload of transmission protocol and to be easily transformed therebetween. In other words, the formats of data units are defined to encapsulate encoded media for storage or delivery and to be easily transformed between the two formats.

The encapsulation layer (E-layer), as shown in FIG. 1, may include an MMT E.1 layer, an MMT E.2 layer, and an MMT E.3 layer.

The E.3 layer encapsulates a media fragment unit (MFU) provided from the media codec A to generate a media processing unit (MPU).

Media data encoded from a higher layer is encapsulated into an MFU. The type and value of the encoded media may be abstracted so that the MFU may be generally used in specific codec technology. This enables a lower layer to be able to process the MFU without access to the encapsulated, encoded media. The lower layer calls requested media data out of a buffer of a network or storage and transmits it to a media decoder. The MFU has an information media part unit enough to perform the above-described operation.

The MFU may have a format independent from any specific codec, which may load a data unit independently consumable in the media decoder. The MFU may be, e.g., a picture or slice of a video.

One or a group of multiple MFUs that may be independently transmitted and decoded generate MPUs. Non-timed media that may be independently transmitted and executed also generate MPUs. The MPU describes an inner structure such as arrangement and pattern of the MFU that enables partial consumption and rapid access to the MFU.

The E.2 layer encapsulates the MPU generated in the E.3 layer and generates an MMT asset.

A sequence of MPUs from the same source component generates an MMT asset. The MMT asset is packaged in the MMT package, is configured with other ones by the composition information (MMT-CI) and MMT transport characteristics (MMT-TC), is multiplexed with other ones by the MMT payload format, and is transmitted by the MMT protocol.

The MMT asset is a data entity consisting of one or more MPUs from a single data source and is a data unit that defines composition information (CI) and transport characteristics (TC). The transport characteristics may be called asset delivery characteristics (ADC). The MMT asset may correspond to a PES (Packetized Elementary Stream). For example, the MMT asset may correspond to, for example, a video, an audio, program information, an MPEG-U widget, a JPEG image, an MPEG 4 file format, or an M2TS (MPEG transport stream).

The E.1 layer encapsulates the MMT asset generated in the E.2 layer and generates an MMT package.

The MMT asset is packaged with MMT composition information (MMT-CI) for the same user experienced future response separately from or together with other functional regions-transmission region and signal region. The MMT package is also packaged with transmission characteristics that picks a transmission scheme proper for each MMT asset to satisfy the felt quality of the MMT asset.

Figure 3:
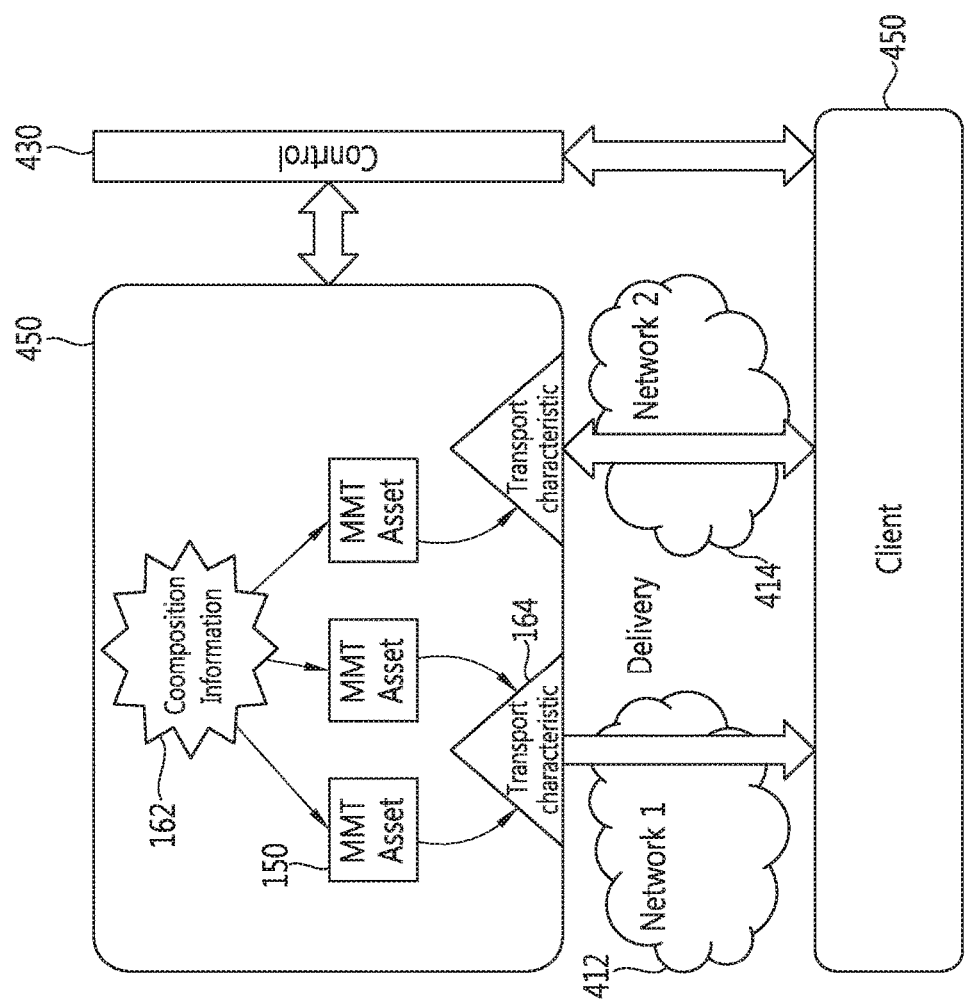
FIG. 3 is a concept view illustrating a configuration of an MMT package.

Referring to FIG. 3, the MMT package 450 may include one composition information 162 and at least one transmission characteristic 164 or one or more MMT assets 150 together with side information such as asset delivery characteristics (ADC). The composition information 162 includes information on a relationship between the MMT assets, and in case one content consists of a plurality of MMT packages, the composition information may further include information for indicating a relationship between the plurality of MMT packages. The transmission characteristics 164 may include transmission characteristic information necessary to determine the delivery condition of the MMT asset or MMT packet—for example, traffic description parameters and QoS descriptors. The MMT package may correspond to the program of MPEG-2 TS.

Further, processing of the package is applied based on MPU, and since the asset is a set of at least one MPU having an asset ID, one package may be considered to have one composition information, at least one MPU and asset transmission characteristics associated with each asset.

The composition information includes information on a relationship between MMT assets, and in case one content consists of a plurality of MMT packages, it may further include information for indicating a relationship between the plurality of MMT packages.

The asset delivery characteristics (ADC) represent a QoS request and statistics for delivery of assets. A plurality of assets may be associated with one ADC. The ADC may be used to set the parameter of the MMT protocol and MMT payload by an entity of packetizing a package for effective delivery of assets.

The asset delivery characteristics (ADC) may include delivery characteristics information necessary to determine the delivery condition of the MMT asset or MMT packet. For example, the asset delivery characteristics (ADC) may include traffic description parameters and QoS descriptors.

The delivery layer (D-layer) defines a payload format and an application layer transmission protocol. The payload format is defined to be able to carry encoded media data regardless of media type or encoding scheme. The application layer transmission protocol provides enhanced characteristics for delivery of a package including cross-layer communication and multiplexing.

The delivery layer may perform, e.g., network flow multiplexing, network packetization, and QoS on media transmitted through a network.

The delivery layer or delivery functional area defines the application layer protocol and format of payload. The application layer protocol according to the present invention provides enhanced features for delivery of an MMT package as compared with the conventional application layer protocol for transmission of multimedia including multiplexing. The payload format is defined to deliver encoded media data regardless of media type or encoding scheme.

The delivery layer (D-layer) is in charge of, between the transport layer and the encapsulation layer (E-layer), multiplexing of media such as video and audio transmitted through a network, aggregation and/or fragmentation of a packet level, network packetization, QoS control, synchronization function, and interfacing between the transport layer such as the existing RTP, the transport layer such as the existing UDP or TCP, the encapsulation layer (E-layer), and signaling layer (S layer).

The delivery layer (D-layer) identifies different types of payloads that came over from the encapsulation layer (E-layer) to handle the payloads from the encapsulation layer (E-layer). The delivery layer (D-layer) may treat a temporary relationship between packets delivered through different networks and different channels. The synchronization function may include hybrid network syncing using a timestamp.

The delivery layer (D-layer) may treat timing constraints of MMT delivery packets for real time media transmission. The delivery layer (D-layer) may perform error control on MMT media packets such as forward error correction and re-transmission. The delivery layer (D-layer) may perform flow control on the MMT media packets. The delivery layer (D-layer) may perform interaction with other MMT layers as well as lower layers (MAC, PHY) through a cross-layer design in order to maintain a predetermined level of QoS for delivery of the MMT media packets. Further, the delivery layer (D-layer) may provide a function for performing group communication.

The delivery layer (D-layer), as shown in FIG. 1, may include an MMT D.1 layer, an MMT D.2 layer, and an MMT D.3 layer.

The D.1 layer receives an MMT package generated in the E.1 layer and generates an MMT payload format. The MMT payload format is a payload format for transmitting an MMT asset and transmitting information for consumption by other existing application transmission protocol such as MMT application protocol or RTP. The MMT payload may include a fragment of an MFU together with information such as AL-FEC.

The MMT payload format is defined as a normal payload format for packetizing the content component of the package. The MMT payload format is defined regardless of a specific media codec, so that any type of media encapsulated such as MPU may be packetized into the payload for an application layer transmission protocol supporting streaming delivery of media content. The MMT payload may be used in the payload format for RTP, MMT and other packet transmission protocols. The MMT payload may also be used for packetizing a signaling message.

The D.2 layer receives an MMT payload format generated in the D.1 layer and generates an MMT transport packet or an MMT packet. The MMT transport packet or MMT packet have a data format used in an application transmission protocol for MMT.

The D.3 layer supports QoS by providing the function of being able to exchange information between layers by cross-layer design. For example, the D.3 layer may perform QoS control using the QoS parameter of MAC/PHY layers. The QoS parameters of MAC/PHY may include, e.g., a bit rate, a packet loss ratio, a predicted delay, and an available buffer size.

The S layer or signaling layer (S layer) performs a signaling function. For example, the S layer may perform signaling functions for session initialization/control/management of transmitted media, a server-based and/or client-based trick mode, service discovery, and synchronization and an interfacing function between other layers, i.e., delivery layer (D-layer) and encapsulation layer (E-layer).

The signaling functional area defines the format of a message that manages delivery and consumption of an MMT package. The message for consumption management is used to transport the structure of the MMT package, and the message for delivery management is used to transport the structure of a payload format and the configuration of a protocol.

The S layer, as shown in FIG. 1, may include an MMT S.1 layer and an MMT S.2 layer.

The S.1 layer may conduct functions such as service discovery, media session initialization/termination, media session presentation/control, and interfacing with a delivery (D) layer and encapsulation (E) layer. The S.1 layer may define the format of control messages between applications for media presentation session management. The presentation session management may define the format of the control message exchanged between applications so as to provide information required for media presentation, session management, and media consumption.

The S.2 layer may define the format of a control message exchanged between delivery end-points of delivery layer (D-layer) regarding flow control, delivery session management, delivery session monitoring, error control, and hybrid network synchronization control.

The S.2 layer may include signaling for adaptive delivery, signaling for synchronization under a complex delivery environment, resource reservation for a configured delivery session, error control, flow control, delivery session monitoring, delivery session establishment and release in order to support the operation of a delivery layer. The S.2 layer may provide signaling necessary between a sender and a receiver. In other words, the S.2 layer may provide signaling necessary between the sender and the receiver so as to support the operation of a delivery layer as described above. Further, the S.2 layer may be responsible for interfacing with a delivery layer and an encapsulation layer.

The control message or control information may be generated in the signaling layer (S layer) and may be transmitted through a broadcast network and/or broadband network.

Figure 2:
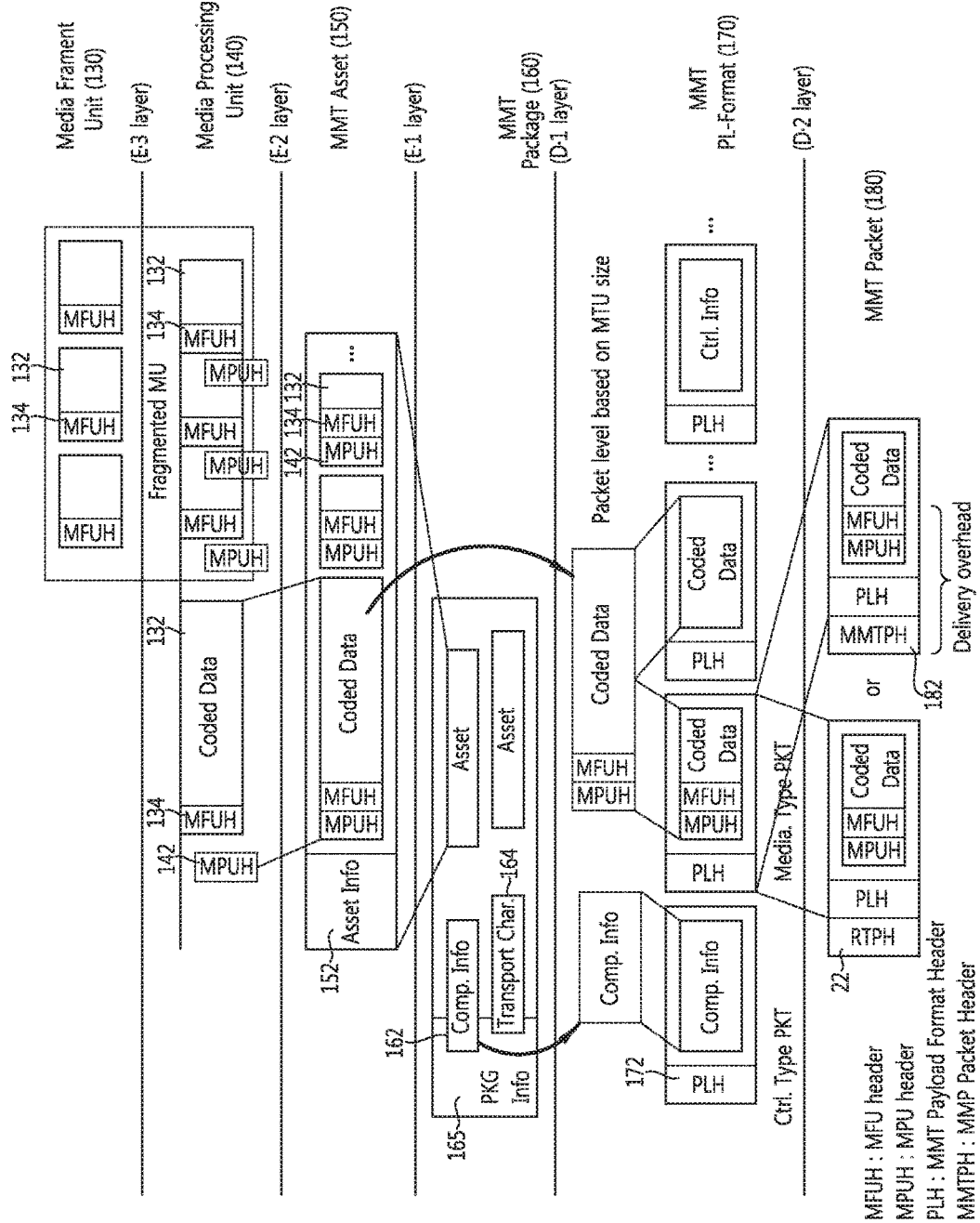
FIG. 2 illustrates the format of unit information (or data or a packet) used in each layer of an MMT layer structure as shown in FIG. 1.

FIG. 2 illustrates the format of unit information (or data or a packet) used in each layer of an MMT layer structure as shown in FIG. 1.

The media fragment unit (MFU) 130 may include encoded media fragment data 132 and an MFUH (Media Fragment Unit Header) 134. The MFU 130 has a general container format independently from a specific codec and may load the smallest data unit as independently consumable in a media decoder. The MFUH 134 may include side information such as media characteristics—for example, loss-tolerance. The MFU 130 may be, e.g., a picture or slice of a video.

The MFU may define a format in which part of an AU is encapsulated in a transport layer to perform adaptive transmission in a range of the MFU. The MFU may be used to transport a predetermined format of encoded media so that part of an AU may be independently decoded or discarded.

The MFU has an identifier for distinguishing one MFU from the other MFUs and may have information on a general relationship between MFUs in a single AU. The relationship in dependency between the MFUs in the single AU may be described, and a related priority order of MFUs may be described with part of such information. The above information may be used to treat transmission in a lower transport layer. For example, the transport layer may skip transmission of MFUs that may be discarded so as to support QoS transmission in an insufficient bandwidth.

The MPU is a set of media fragment units including a plurality of media fragment units 130. The MPU may have a general container format independently from a specific codec and may include media data equivalent to an access unit. The MPU may have a timed data unit or a non-timed data unit.

The MPU is data independently and completely processed by a medium following the MMT, and such process may include encapsulation and packetization. The MPU may include at least one MFU or may have part of data having a format defined by other standards.

A single MPU may accommodate non-timed data or an integral number of at least one AU. For timed data, the AU may be delivered from at least one MFU, but one AU may not be split into multiple MPUs. In the non-timed data, one MPU accommodates part of non-timed data independently and completely processed by a medium observing the MMT.

The MPU may be uniquely identified in an MMT package by a sequence number and an associated asset ID that distinguishes the MPU from other MPUs.

The MPU may have at least one arbitrary access point. A first byte of the MPU payload may always start with the arbitrary access point. In the timed-data, the above fact means that in the MPU payload, the priority in decoding order of the first MFU is always 0. In the timed-data, the presentation period and decoding order of each AU may be sent to inform the presentation time. The MPU does not have its initial presentation time, and the presentation time of the first AU in one MPU may be described in the composition information. The composition information may specify the first presentation time of the MPU.

The MMT asset 150 is a set of a plurality of MPUs. The MMT asset 150 is a data entity consisting of multiple MPUs (timed or non-timed data) from a single data source, and the MMT asset information 152 includes side information asset packaging metadata and data type. The MMT asset 150 may include, e.g., a video, an audio, program information, an MPEG-U widget, a JPEG image, an MPEG 4 FF (File Format), a PES (Packetized Elementary Stream), and an M2TS (MPEG transport stream).

The MMT asset is a logical data entity that has encoded media data. The MMT asset includes an MMT asset header and encoded media data. The encoded media data may be a group of MPUs collectively referred to with the same MMT asset ID. Types of data that are each consumed by an entity directly connected to an MMT client may be an individual MMT asset. Examples of such data types may include MPEG-2 TS, PES, MP4 file, MPEG-U Widget Package, and JPEG file.

The encoded media of the MMT asset may be timed data or non-timed data. The timed data is audio-visual media data that requires synced decoding and presentation of specific data at a designated time. The non-timed data may be data of a type that may be decoded and provided at any time depending on provision of a service or users' interaction.

The service provider may generate a multimedia service by integrating the MMT assets and putting the MMT assets on spatial-temporal axes.

The MMT package 160 is a set of MMT assets that include one or more MMT assets 150. The MMT assets in the MMT package may be multiplexed or concatenated like a chain.

The MMT package has a container format for configuration information and an MMT asset. The MMT package provides storage of the MMT asset and configuration information for an MMT program.

The MMT program provider generates configuration information by encapsulating encoded data into MMT assets and describing the temporal and spatial layouts of the MMT assets and their transmission characteristics. The MU and MMT asset may be directly transmitted in the D.1 payload format. The configuration information may be transmitted by the C.1 presentation session management message. However, the MMT program provider and client that allow relay or future reuse of the MMT program store this in the MMT package format.

In parsing the MMT package, the MMT program provider determines a transmission path (for example, broadcast or broadband) along which the MMT asset is provided to the client. The configuration information in the MMT package, together with transmission-related information, is transmitted to the C.1 presentation session management message.

The client receives the C.1 presentation session management message and is aware of what MMT program is possible and how the MMT asset for the corresponding MMT program is received.

The MMT package may be transmitted by the D.1 payload format as well. The MMT package is packetized into the D.1 payload format and is delivered. The client receives the packetized MMT package and configures part or whole thereof, and here consumes the MMT program.

The package information 165 of the MMT package 160 may include configuration information. The configuration information may include side information such as a list of MMT assets, package identification information, composition information, and transmission characteristics 164 or asset delivery characteristics (ADC). The composition information 162 includes information on a relationship between the MMT assets 150.

Further, the composition information 162, in case one content consists of a plurality of MMT packages, may further include information for representing a relationship between the plurality of MMT packages. The composition information 162 may include information on a temporal, spatial, and adaptive relationship in the MMT package.

Like information assisting in transmission and presentation of the MMT package, the composition information in the MMT provides information for a spatial and temporal relationship between MMT assets in the MMT package.

MMT-CI is descriptive language expanding HTML5 and providing information. While HTML5 has been designed to describe a text-based content page-based presentation, MMT-CI primarily represents a spatial relationship between sources. To support an expression that informs a temporal relationship between MMT assets, expansion may be made to have information associated with the MMT asset that is included in the MMT package like presentation resources, time information for determining the order of transmission and consumption of MMT assets and additional attributes of media elements that consume various MMT assets in HTML5. A detailed description will be described below.

The asset delivery characteristics (ADC) or transmission characteristic information 164 includes information on transmission characteristics and may provide information necessary to determine transmission conditions of each MMT asset (or MMT package). The asset delivery characteristics (ADC) or transmission characteristic information may include a traffic description parameter and a QoS descriptor.

The traffic description parameter may include priority information and bit rate information on the media fragment unit (MFU) 130 or MPU. The bit rate information may include, e.g., information on whether the MMT asset has a variable bit rate (VBR) or constant bit rate (CBR), a guaranteed bit rate for the media fragment unit (MFU) (or MPU), and a maximum bit rate for the media fragment unit (MFU) (or MPU). The traffic description parameter may be used for resource reservation between a server, a client, and other constituent elements on a delivery path, and may include, e.g., information on the maximum size of the media fragment unit (MFU) (or MPU) in the MMT asset. The traffic description parameter may be periodically or aperiodically updated.

The QoS descriptor may include information for QoS control, e.g., delay information and loss information. The loss information may include, e.g., a loss indicator indicating whether the delivery loss of the MMT asset is acceptable. For example, the loss indicator being '1' denotes 'lossless', and the loss indicator being '0' denotes 'lossy.' The delay information may include a delay indicator used to indicate the sensitivity of a transport delay of the MMT asset. The delay indicator may indicate whether the type of the MMT asset is conversation, interactive, real time or non-real time.

One content may consist of one MMT package. Or, one content may consist of a plurality of MMT packages.

In case one content consists of a plurality of MMT packages, composition information or configuration information indicating temporal, spatial, and adaptive relationships between the plurality of MMT packages may be present inside one of the MMT packages or outside the MMT packages.

For example, in the case of hybrid delivery, some of the content components may be transmitted through a broadcast network while the others of the content components may be transmitted through a broadband network. For example, in the case a plurality of AV streams constituting one multi-view service, one stream may be transmitted through a broadcast network, another stream may be transmitted through a broadband network, and each AV stream may be multiplexed and individually received and stored by a client terminal. Or, by way of example, there may be a scenario in which application software such as widgets may be transmitted through a broadband network, and AV streams (AV programs) may be transmitted through an existing broadcast network. Further, in another embodiment, one media component may be transmitted through a broadband network, and another media component may be transmitted through another broadband network.

In the case of the above-described multi-view service scenario and/or widget scenario, all of the plurality of AV streams may become one MMT package. In such case, one of the plurality of streams may be stored in only one client terminal and storage content becomes part of the MMT package. The client terminal should re-record composition information or configuration information, and the re-recorded content becomes a new MMT package that is not related to a server.

In the case of above-described multi-view scenario and/or widget scenario, each AV stream may become one MMT package. In such case, the plurality of MMT packages constitutes one content. Recording is performed on a per-MMT package basis in the storage. Composition information or configuration information indicating a relationship between the MMT packages is needed.

The composition information or configuration information included in one MMT package may refer to the MMT asset in other MMT package. The outside of the MMT package may be represented that refers to the MMT package under the out-band circumstance.

Meanwhile, in order to inform the client terminal of a path available for delivery of the MMT package 160 and a list of MMT assets 160 provided by the service provider, the MMT package 160 is translated into service discovery information through the control (C) layer, so that the MMT control message may include an information table for service discovery.

The server that splits multimedia content into a plurality of segments allocates URL information to the plurality of segments and stores URL information for each segment in a media information file and transmits the media information file to the client.

The media information file may be referred to by various terms, such as 'media presentation description (MPD)' or 'manifest file' depending on the standardization organization that standardizes HTTP streaming. Hereinafter, the media information file, upon its description, is referred to as media presentation description (MPD).

Hereinafter, a cross layer interface is described.

The cross layer interface (CLI) exchanges QoS-related information between a lower layer including MAC/PHY layers and an application layer and provides a means for supporting QoS in a single entity. The lower layer provides upstream QoS information such as a network channel condition while the application layer provides information relating to media characteristics as downstream QoS information.

The cross layer interface provides an integrated interface between various network layers including IEE802.11 WiFi, IEEE 802.16 WiMAX, 3G, or 4G LTE and an application layer. Common network parameters in popular network standards are quoted as NAM parameters for static and dynamic QoS control of real-time media applications that pass through various networks.

In the cross layer interface, the application layer provides downstream QoS information related to media characteristics for a lower layer. There are two types of downstream information such as MMT asset level information and packet level information. The MMT asset information is used for capacity exchange and/or resource (re)allocation at the lower layer. The packet level downstream information is recorded in a proper field of each packet for the lower layer to identify a supported QoS level.

Further, in the cross layer interface, the lower layer provides upstream QoS information to the application layer. The lower layer provides information relating to a network status that varies according to times when more correct QoS control may be possible. The upstream information is expressed in an abstract manner so as to support a heterogeneous network environment. Such parameters are measured in the lower layer and are read in the application layer periodically or upon request from the MMT application.

Figure 4:
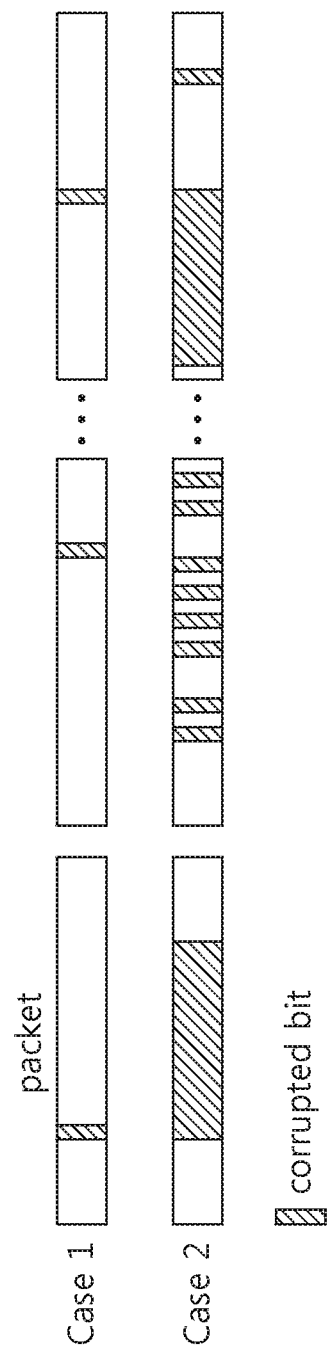
FIG. 4 illustrates a problem that occurs when the packet error rate (PER) is used for rate adaptation.

FIG. 4 illustrates a problem that occurs when the packet error rate (PER) is used for rate adaptation. The PER drops the whole packet if one or more bit errors are present irrespective of the amount of the bit errors, and accordingly, cannot exactly determine whether how many errors have been present in the packet.

Referring to FIG. 4, a problem that may occur when the packet error rate (PER) is used for rate adaptation is described. Case 1 of FIG. 4 shows the situation in which less error bits (or corrupted bits) are included in the packet than in Case 2 of FIG. 4. Accordingly, Case 1 provides a lower BER (Bit Error Rate) than Case 2 does, so that Case 1 shows a better channel environment (lower BER) than Case 2 does. In case PER is used in such two situations (Case 1 and Case 2), the PER is used for rate adaptation, with Case 1 and Case 2 deemed the same channel. Thus, in light of the PER, Case 1 and Case 2 of FIG. 4 are determined to be in the same channel situation.

Figure 5:
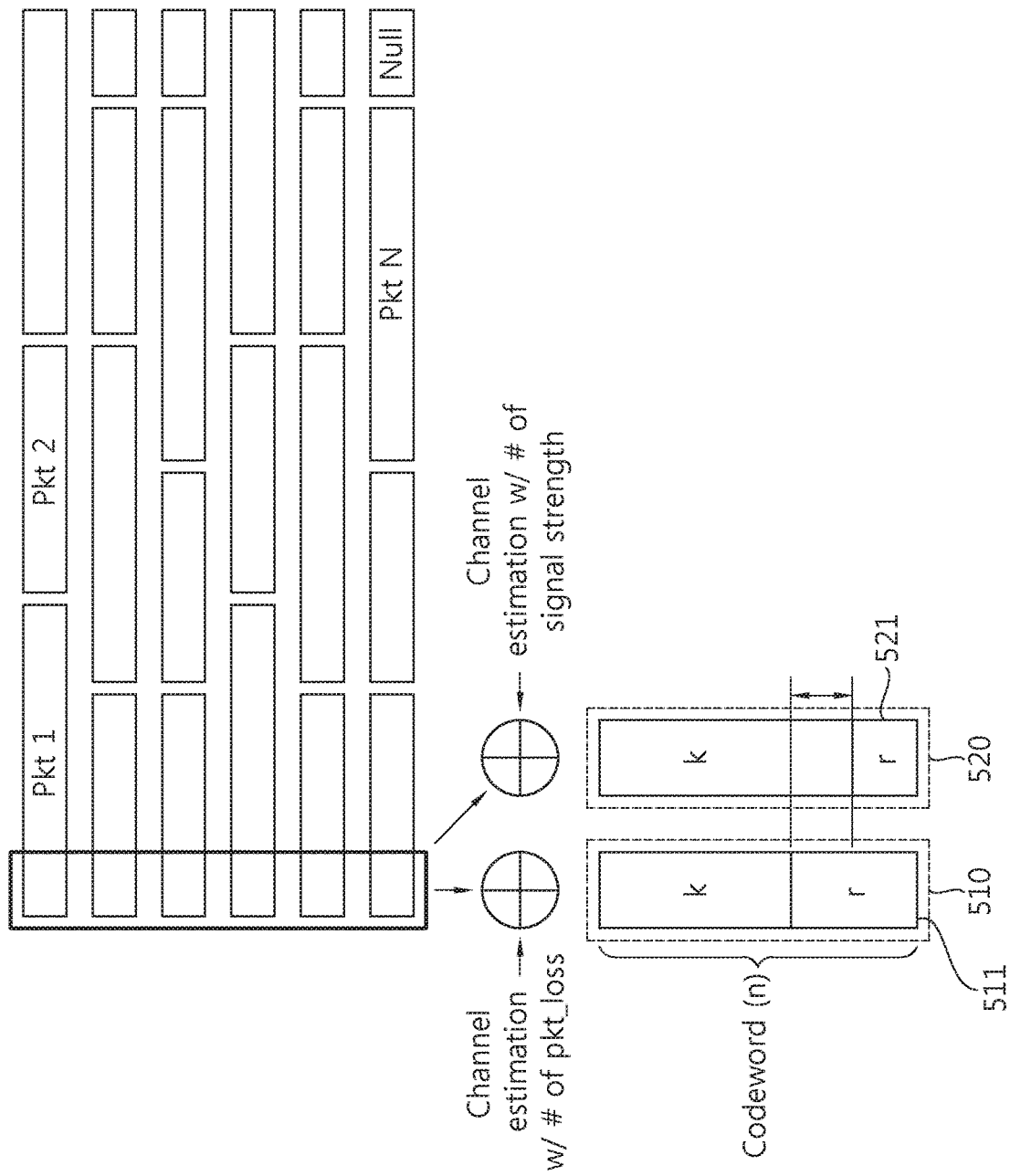
FIG. 5 is a concept view illustrating a comparison, in light of enhancement in throughput, between when using PER with using BER upon rate adaptation in Case 1 of FIG. 4.

FIG. 5 is a concept view illustrating a comparison, in light of enhancement in throughput, between when using PER with using BER upon rate adaptation in Case 1 of FIG. 4. FIG. 5 illustrates, by way of example, two codewords. The first codeword 510 is the codeword obtained when PER is used to perform channel coding (block coding), and the second codeword 520 is the codeword obtained when BER is used to perform channel coding (block coding). In the case of the first codeword 510, the rate of the redundant bit r 511 in the codeword is substantially as much as 50%. However, in the case of the second codeword 520, the rate of the redundant bit r 521 in the codeword is merely on the order of 20%. That is, in case like the first codeword 510 PER is used to perform channel coding (block coding) on Case 1 above, unnecessarily many redundant bits r are used, and thus, it may be further reduced in efficiency as compared with when BER is used to perform channel estimation to conduct channel coding. Resultantly, when BER is used (Case 1 of FIG. 4) may produce an enhanced throughput as compared with when PER is used.

Accordingly, performing rate adaptation using BER enables efficient multimedia transmission. The BER may be estimated using the signal strength and modulation information (FIGS. 7 to 9) in the MAC (Media Access Control) layer, and as in one of the embodiments represented as Tables 1, 2, and 3, may be message standardized, so that it may provide compatibility when used in different wireless networks. The MAC layer estimates the BER using information such as the modulation scheme, signal strength, and ambient wireless traffic, upon reception of MAC packets (as compared with the PHY layer, the MAC layer suffers from a slight drop in BER accuracy).

Embodiment 1

TABLE 1

| | No of bits | Description |
|---|---|---|
| BER | 32 | Error Rate obtained from underlying layer. 1st bit of BER indicates whether BER is obtained from Phy or MAC(0: Physical layer, 1: MAC layer) and the rest is BER) |

According to an embodiment of the present invention, a bit error rate is obtained from the PHY or MAC layer using a BER variable (or parameter). For the BER in the PHY layer, the BER value is suggested as a positive value. For the BER in the MAC layer, the BER value is suggested as a negative value that may be used as an absolute value. That is, the MSB (Most Significant Bit) of the BER is a flag indicating the PHY or MAC layer.

Embodiment 2

TABLE 2

| | No of bits | Description |
|---|---|---|
| Type | 8 | Indication whether BER is obtained from Physical Mac layer. |
| BER | 32 | Bit Error Rate obtained from Phy or MAC layer. |
| Duration | 32 | Duration in millisecond that a BER computed |

According to another embodiment of the present invention, after the BER is estimated in the PHY layer or MAC layer, it may be delivered to a higher layer using a BER variable (or parameter). A Type variable (or parameter) is used to indicate which one of the PHY layer and the MAC layer the bit error rate is obtained from.

Since an error check can be done on a per-bit basis in the physical layer, an exact BER value may be estimated. In the MAC layer, upon reception of an MAC packet, the BER is estimated using information such as the modulation scheme, signal strength, and ambient wireless traffic (the accuracy of the BER value is slightly reduced as compared with the PHY layer). The TYPE field specifies the layer where the BER is delivered.

Embodiment 3

TABLE 3

| | No of bits | Description |
|---|---|---|
| BER | 32 | Bit Error Rate obtained from Phy or MAC layer. |
| Duration | 32 | Duration in millisecond that a BER computed |

Hereinafter, an example of using a BER parameter in an NAM parameter in a cross layer interface of a multimedia system using BER according to an embodiment of the present invention is described. In the cross layer interface, the NAM parameter may be used as an interface between the application layer and a lower layer. The NAM parameter may include a BER value that is a bit error rate. The BER may be measured in the PHY or MAC layer. Further, the NAM provides for identification, available bit rate, buffer status, peak bit rate, service unit size, and service data unit loss rate of a lower network.

Two different methods may be used to provide the NAM. One of the methods is to provide an absolute value. The absolute NAM information is a raw QoS value as measured in each unit. The other method is to provide a relative value. Table 4 below shows syntax of the absolute NAM parameter.

TABLE 4

| Syntax | size (bits) | Mnemonic |
|---|---|---|
| Network Abstraction for Media information { | | |
| CLI_id | 8 | unsigned int |
| ... | ... | ... |
| BER | 32 | float |
| } | | |

Here, CLI_id is an integer that allows the lower network to identify the corresponding NAM. BER (Bit Error Rate) is a bit error rate measured last in the PHY or MAC layer. The BER measured in the PHY is provided as a positive value. The BER measured in the MAC layer is provided as a negative value, and upon actual use, an absolute value thereof is used.

The relative NAM information is represented as a ratio of a current NAM value to a predicted NAM value. For example, it may be expressed as a ratio of the predicted NAM value relative to the current NAM value, or may be expressed as a ratio of the current NAM value relative to the predicted NAM value. The method of providing the relative NAM information may be used for the purpose of updating the NAM when on access or to notify the trend of a change in QoS environment. Table 5 below shows syntax of the relative NAM parameter.

TABLE 5

| Syntax | size (bits) | Mnemonic |
|---|---|---|
| relative_difference Network Abstraction for Media information ( ) { | | |
|     CLI_id | 8 | unsigned integer |
|     relative_bitrate | 8 | float |
|     relative_buffer_fullness | 8 | float |
|     relative_peak_bitrate | 8 | float |
|     average_bitrate_period | 16 | unsigned int |
|     current_delay | 32 | float |
|     generation_time | 32 | float |
|     BER | 32 | float |
| } | | |

Here, CLI_id is an integer that enables a lower network to identify the corresponding NAM. BER (Bit Error Rate) is a bit error rate measured last in the PHY or MAC layer. The BER measured in the PHY layer is provided as a positive value. The BER measured in the MAC layer is provided as a negative value, and upon actual used, an absolute value thereof is used.

Further, the BER may be used in an NAMF (Network Aware Media Feedback) message among messages related to delivery of a package. The NAMF is the format of an NAM parameter report fed back from a receiving apparatus to a transmitting apparatus. Table 6 below shows the syntax of the NAM feedback.

TABLE 6

| Syntax | size (bits) | Mnemonic |
|---|---|---|
| NAM_Feedback_message ( ) { | | |
|     message_id | 16 | unsigned short |
|     .... | ... | ... |
|     payload{ | | |
|         CLI_id | 8 | unsigned integer |
|         .... | ... | ... |
|         BER | 32 | float |
|         } | | |
|     } | | |
| } | | |

Here, message_id indicates the ID of the NAM feedback message. For example, message_id may have a length of a total of 16 bits. CLI_id is an integer for identifying a specific NAM in a lower network. BER is a value generated in the PHY or MAC layer. The BER generated in the PHY layer has a positive value. The BER generated in the MAC layer has a negative value, and upon its use, an absolute value thereof is used. As shown in Table 6, the BER parameter may be inserted in the payload of NAM_Feedback_message and may be fed back from the receiving apparatus to the transmitting apparatus.

Figure 6:
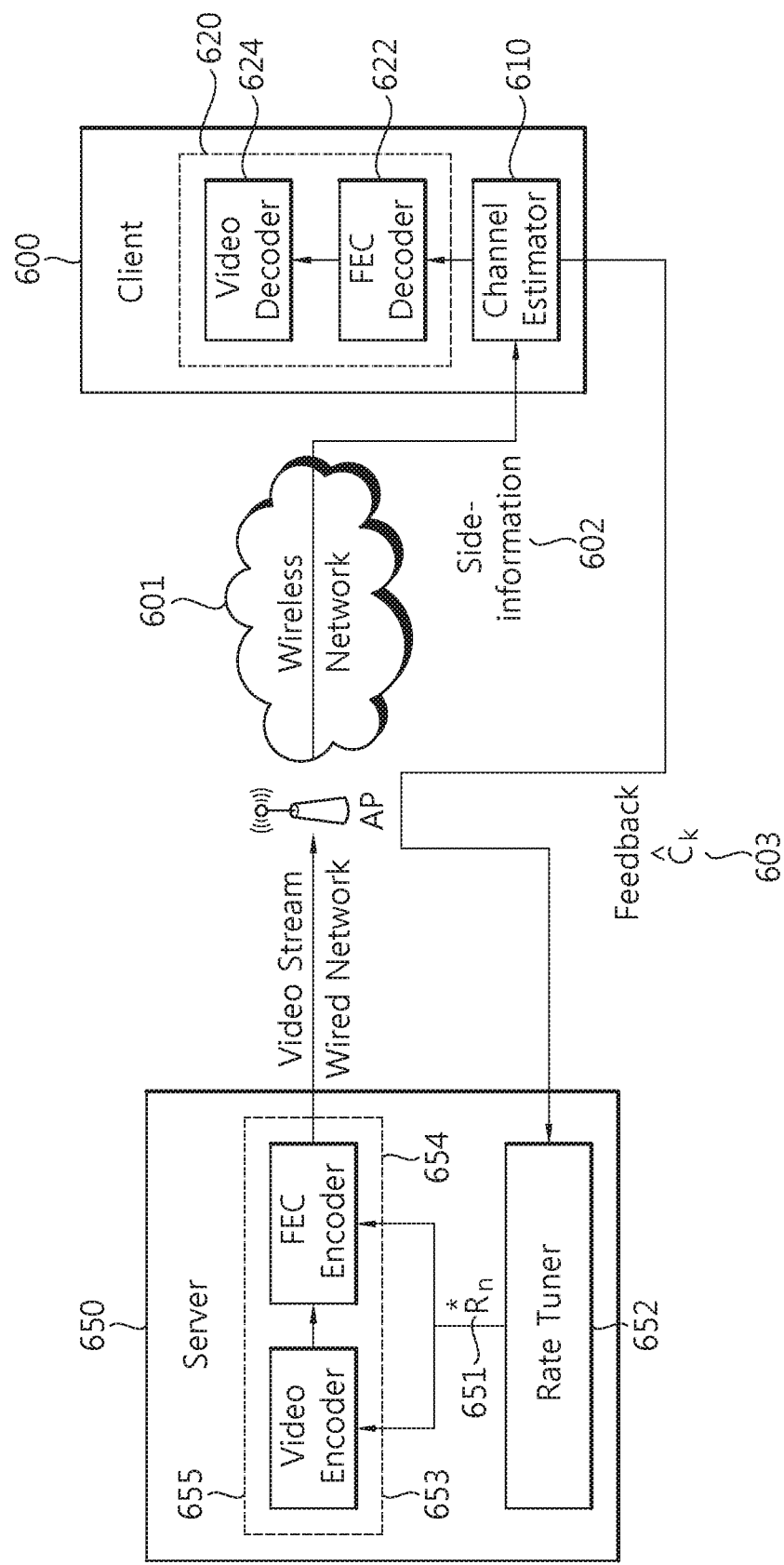
FIG. 6 is a block diagram illustrating a multimedia system using a BER according to an embodiment of the present invention.

FIG. 6 is a block diagram illustrating a multimedia system using a BER according to an embodiment of the present invention. Referring to FIG. 6, the multimedia system using a BER according to an embodiment of the present invention includes a transmitting apparatus 650, a receiving apparatus 600, and a wireless network such as an AP. According to an embodiment of the present invention, the transmitting apparatus 650 may be a server, and the receiving apparatus 600 may be a client.

The transmitting apparatus 650 includes a video encoder 653, an FEC (Forward Error Correction) encoder 654, a rate tuner 652, and a transmitting unit. The video encoder 653 and the FEC encoder 654 form an encoder unit 655, and this corresponds to a media data generating unit that generates media data to be transmitted.

The video encoder 653 generates a symbol block by performing channel coding on an MMT packet block including at least one MMT packet or an MMT transmission packet block including at least one MMT transmission packet so as to transmit the MMT transmission packet or MMT packet, and the FEC encoder 654 delivers a vide stream generated by performing FEC encoding on the generated symbol block to the transmitting unit.

The rate tuner 652 controls the operation of the encoder unit 655 by receiving the feedback information 603 received from the receiving apparatus 600. For example, the rate tuner 652 may select a channel coding rate of the encoder unit 655 by performing rate control on the video stream according to the channel condition.

Since the feedback information 603 received from the receiving apparatus includes an estimated BER value and information on the layer in which the BER has been estimated, the rate tuner 652 may control the channel coding rate of the encoder unit 655 to control the operation by estimating the channel condition using the information of the estimated layer and the BER value.

In another embodiment, the rate tuner 652 may control the operation of the encoder unit 655 using the channel condition information that is estimated in the receiving apparatus 600 using the BER value and the information in which the BER has been estimated and that is included in the feedback information 603.

The encoder unit 655 codes the channel at a coding rate under the control of the rate tuner 652 and transmits the video stream to the receiving apparatus 600. More specifically, the encoder unit 655 delivers the video stream generated by performing channel coding on the MMT transmission packet according to the corresponding coding rate to the transmitting unit, and the transmitting unit delivers the video stream to an AP through a wired network. The AP delivers the video stream to the receiving apparatus 600 through a wireless network 601.

While the transmitting apparatus 650 transmits the video stream to the receiving apparatus 600, side information 602 may be generated. At this time, the side information may include only the side information that is generated over the wireless network. For example, the side information may include a signal strength, modulation information, and ambient wireless traffic information. The receiving unit of the receiving apparatus 600 may receive the side information 602 while simultaneously receiving the video stream.

The receiving apparatus 600 includes a channel estimator 610, an FEC decoder 622, a video decoder 624, and a receiving unit. The FEC decoder 622 and the video decoder 624 constitute a decoder unit 620. The FEC decoder 622 generates a symbol block by performing FEC decoding on the received video stream, and the video decoder 624 generates an MMT transmission packet block or MMT packet block by performing video decoding on the generated symbol block, thereby generating an MMT transmission packet or MMT packet.

The channel estimator 610 estimates the channel condition using the BER value estimated by using the side information 602 obtained through the receiving unit and generates the estimated channel condition as channel condition information. The channel condition estimator may deliver the generated channel condition information to the decoder unit 620 or application layer, and at this time, it may use the cross layer interface of the MMT system. That is, the channel condition estimator may deliver the generated channel condition information to other layers using the NAM parameter. For example, the estimated BER parameter may be included in the NAM parameter and may be delivered to the application layer. Further, the channel condition estimator 610 may deliver the generated channel condition information to the rate tuner 652 of the transmitting apparatus 650.

In another embodiment, the channel condition estimator may deliver to another layer or the transmitting apparatus 650 the BER value estimated in one of the PHY layer and MAC layer, together with an indicator indicating the layer where the BER value has been estimated. In case the channel condition estimator 610 delivers the BER value and the indicator indicating the layer where the BER value has been estimated to the other layer, the channel condition estimator 610 may use a cross layer interface, and in such case, the channel condition estimator 610 may include the BER parameter in the NAM parameter and may deliver it to the other layer.

In case the channel condition estimator 610 feeds back to the transmitting apparatus 650 the BER value, together with the indicator indicating the layer where the BER value has been estimated, the channel condition estimator 610 may include the BER parameter in the NAMF parameter and may deliver it to the transmitting apparatus 650.

Figure 10:
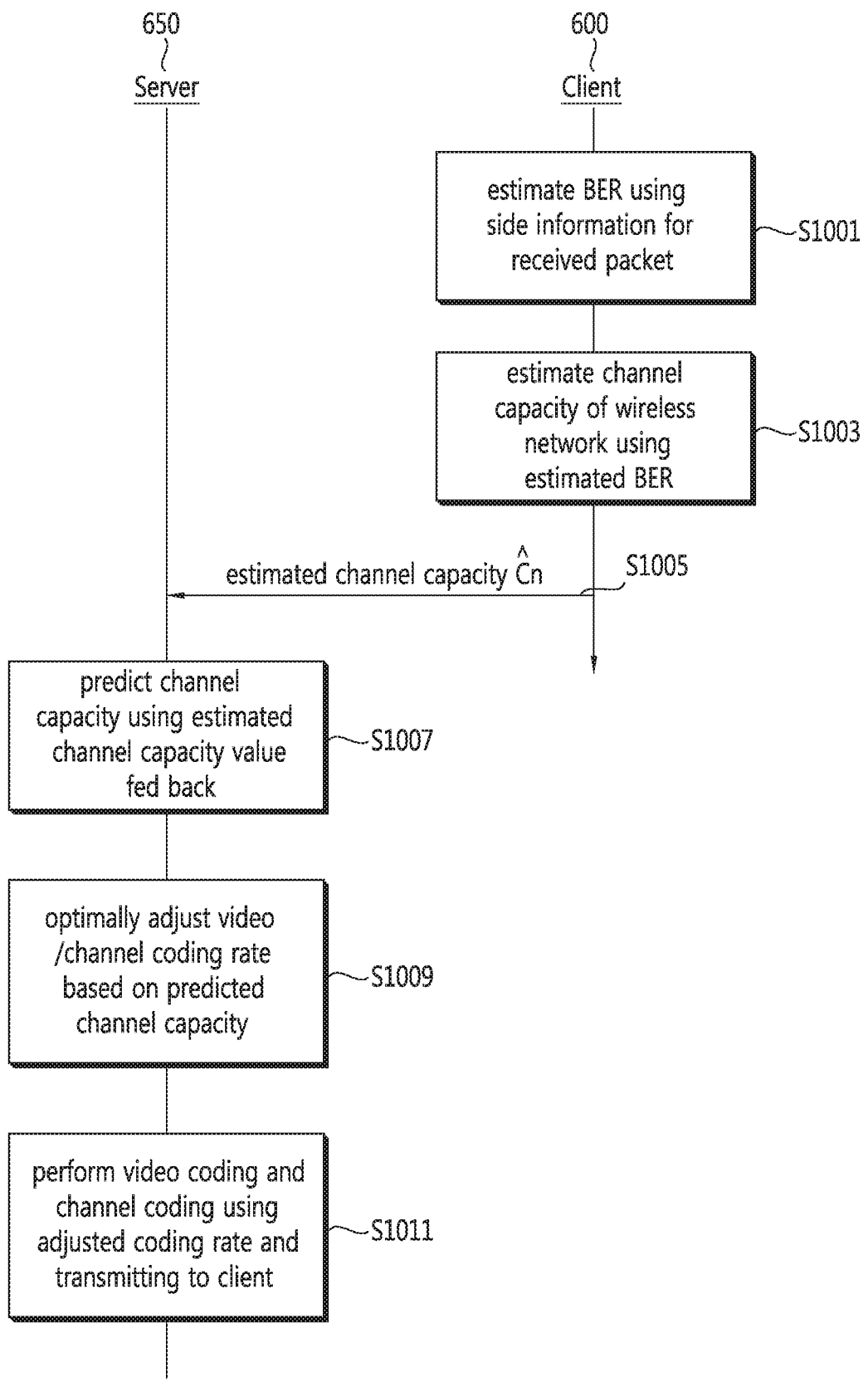

FIGS. 10 and 11 are flowcharts illustrating rate adaptation in a wireless network according to an embodiment of the present invention. Hereinafter, a process of performing receiving apparatus in a multimedia system using a BER according to an embodiment of the present invention is described.

First, the receiving apparatus 600, a client, estimates a BER using side information for a received packet (S100). This may be performed as the client receiving the estimated BER from the PHY layer or MAC layer as shown in FIG. 11 (S1101). Next, the client estimates the channel capacity of the wireless network using the estimated BER (S1003). The client then delivers the estimated channel capacity to the transmitting apparatus 650, a server (S1005). The server predicts the channel capacity using the fed-back estimated channel capacity value (S1007). The server then optimally adjusts the video/channel coding rate based on the predicted channel capacity (S1009). Finally, the server performs video coding and channel coding using the adjusted coding rate and transmits it to the client (S1011).

Figure 7:
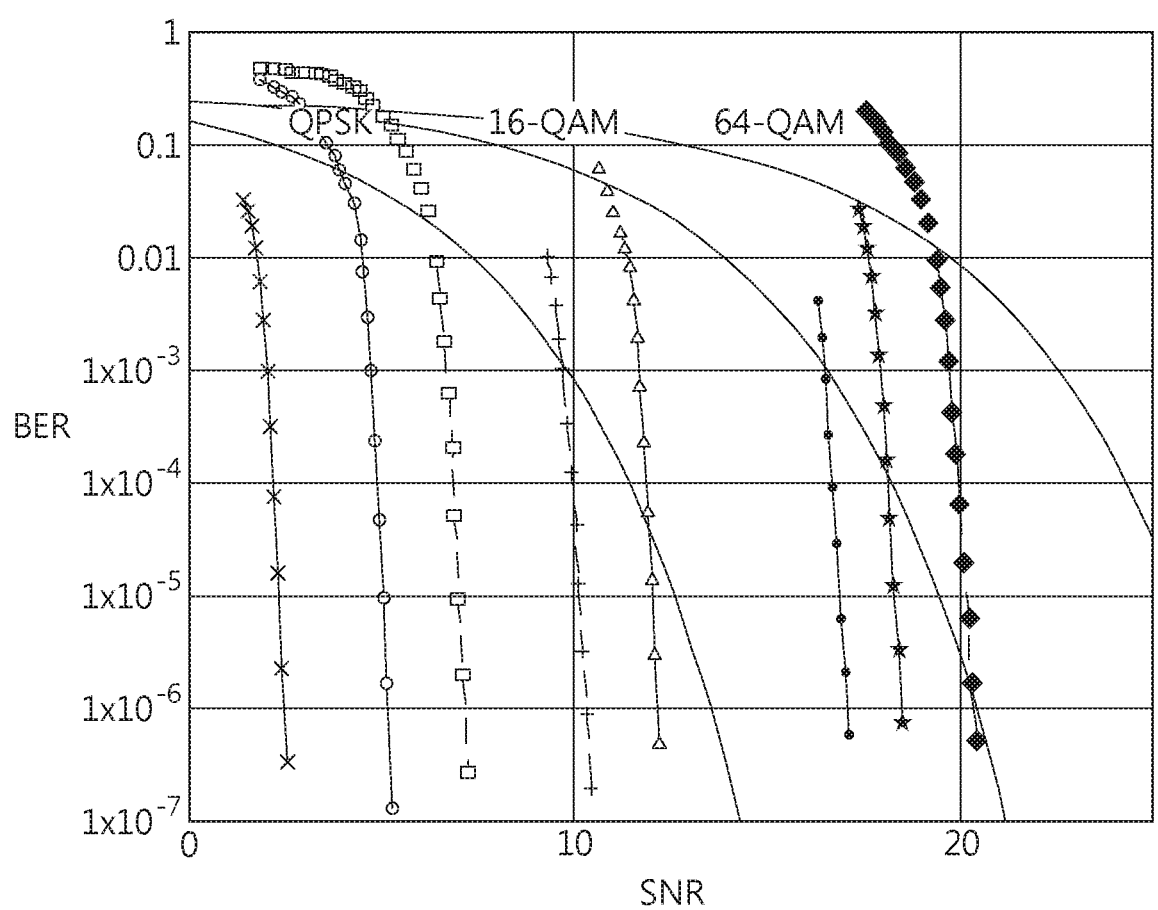
FIGS. 7 to 9 show BER estimation according to signal strength (SNR) and modulation scheme in different wireless networks (MAC layer).
Figure 8:
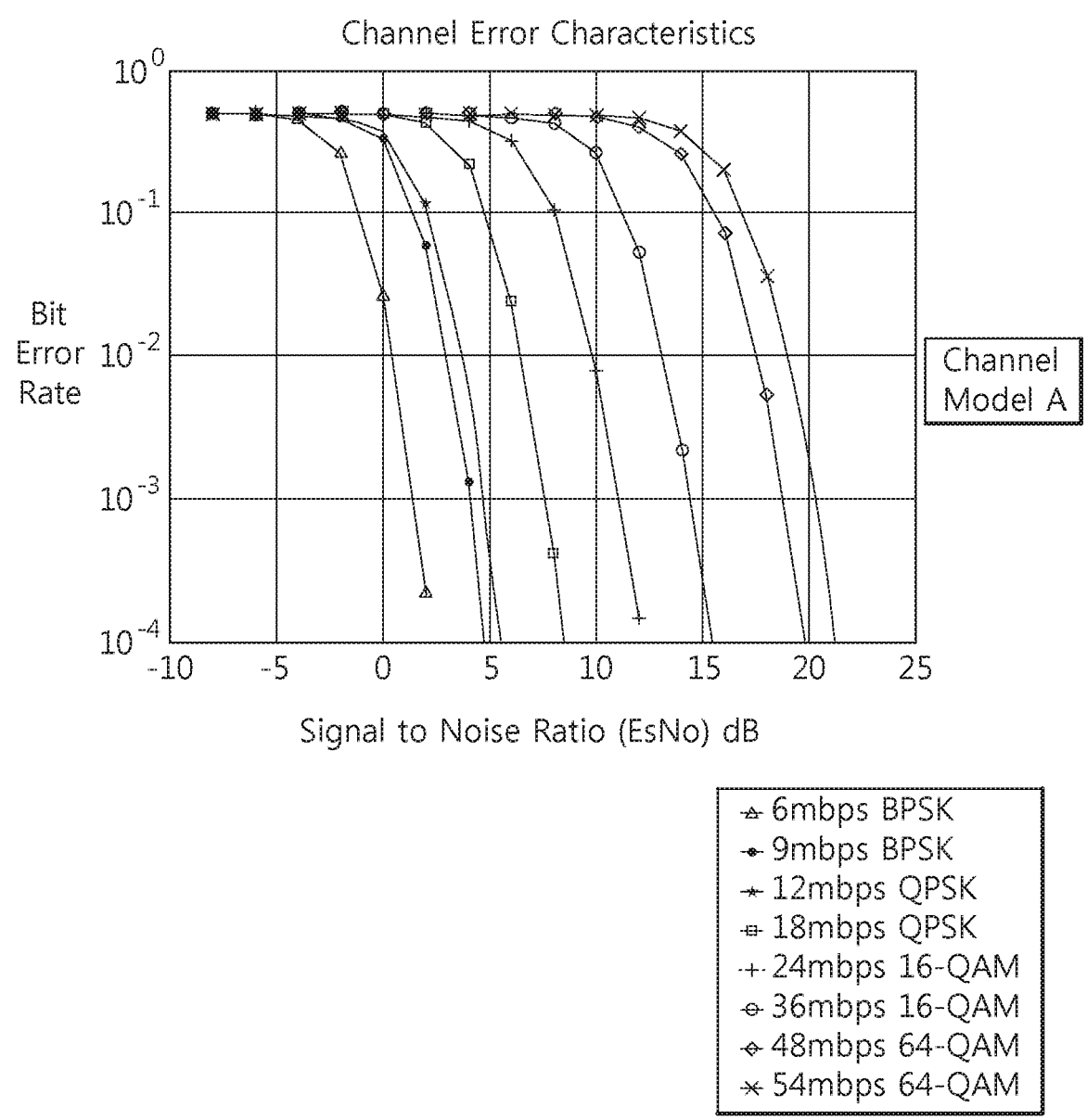
Figure 9:
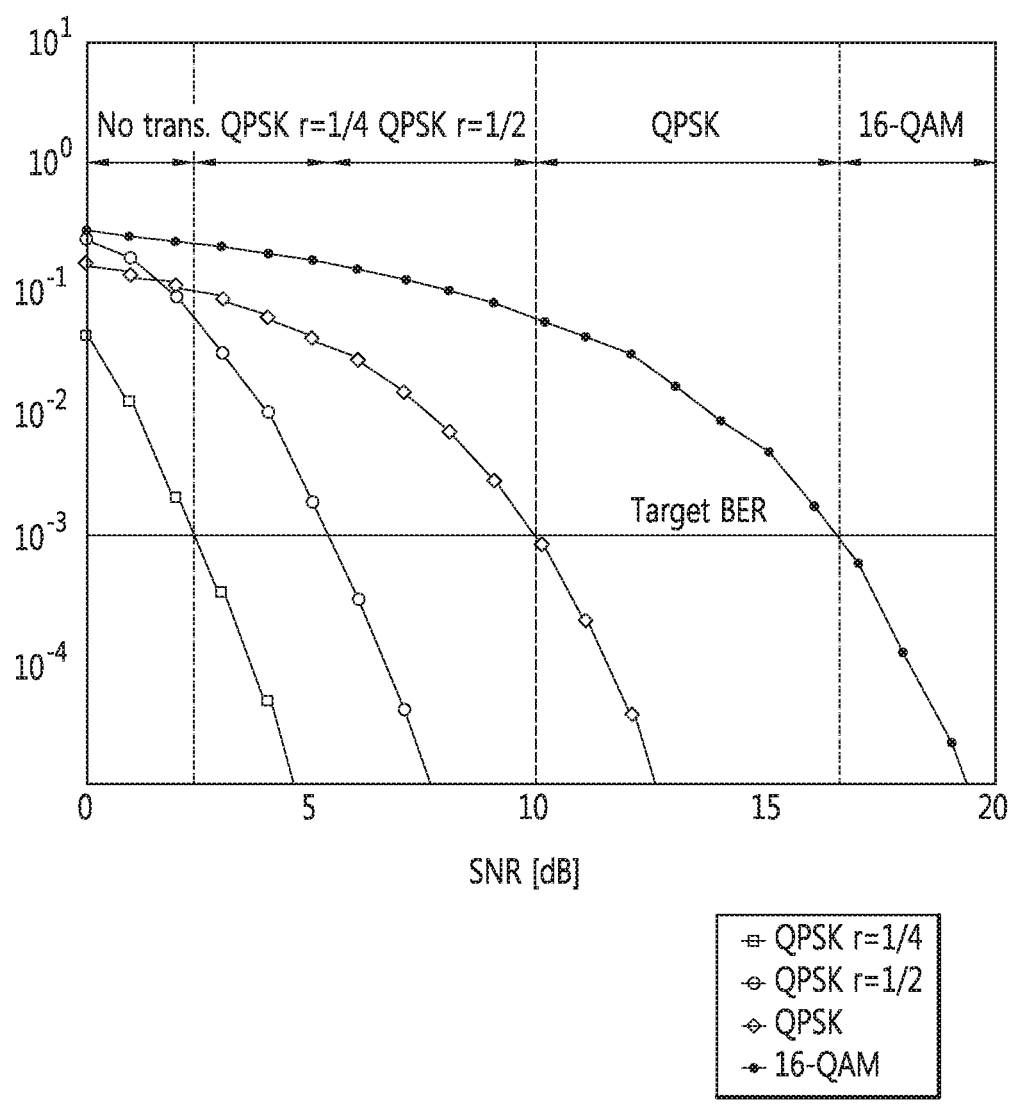

FIGS. 7 to 9 show BER estimation according to signal strength (SNR) and modulation scheme in different wireless networks (MAC layer). FIG. 7 is a graph illustrating a correlation between BER and SNR (Signal to Noise Ratio) in a 802.11a wireless network, FIG. 8 is a graph illustrating a correlation between BER and SNR (Signal to Noise Ratio) in a 802.11g wireless network, and FIG. 9 is a graph illustrating a correlation between BER and SNR (Signal to Noise Ratio) in a WiMax wireless network. As such, the BER estimated value delivered from the MAC or PHY layer may predict the optimal source/channel coding rate or the optimal video/channel coding rate through the following method.

$$\overset{\circ}{R}_n^{op} = \underset{R_n^{op}(0 \le R_n^{op} \le 1)}{\arg\max} \ Q(R_n^{op}T) \cdot \frac{\int_{R_n^{op}-C_n^{\acute{o}p}}^{1-C_n^{\acute{o}p}} \frac{1}{\sqrt{2\pi}\ \sigma_e} \exp\left(\frac{-e_n^2}{2\sigma_e^2}\right) de}{\int_{-C_n^{\acute{o}p}}^{1-C_n^{\acute{o}p}} \frac{1}{\sqrt{2\pi}\ \sigma_e} \exp\left(\frac{-e_n^2}{2\sigma_e^2}\right) de} +$$

[Equation 1]

-continued $$Q'\left(\frac{R_n^{op}-C_n^{op}}{R_n^{op}}\right) \cdot \frac{\int_{-C_n^{\acute{o}p}}^{R_n^{op}-C_n^{\acute{o}p}} \frac{1}{\sqrt{2\pi}\ \sigma_e} \exp\left(\frac{-e_n^2}{2\sigma_e^2}\right) de}{\int_{-C_n^{\acute{o}p}}^{1-C_n^{\acute{o}p}} \frac{1}{\sqrt{2\pi}\ \sigma_e} \exp\left(\frac{-e_n^2}{2\sigma_e^2}\right) de}$$

Referring to Equation 1, Q(·) is a rate distortion (RD) function of video, and the RD function may be obtained upon video encoding.

Q'(·) is a video quality distortion estimation function as channel capacity exceeds. Q'(·) uses f(x)=$ax^b$+c, 0≤x≤0.12, where a=−1.18×$10^2$; b=2.148; and c=0.9898. The above values are obtained through an experiment. Accordingly, the measures may be varied depending on video data, but few errors occur. In particular, more correct values may be obtained as compared with when the values are replaced with 0's. x is a difference between a rate to be predicted and channel capacity $$\left(\text{i.e., } \frac{R_n^{op}-C_n^{op}}{R_n^{op}}\right).$$

In other words, as the difference increases, the distortion of video quality also increases. Here, the Gaussian distribution is a prediction error probability distribution. Thus, the optimal rate in Equation 1 is a value obtained when a combination of Q(·), Q'(·), and rate prediction error probability distribution is the best. The detailed process of obtaining the optimal video/channel coding rate or the optimal source/channel coding rate using Equation 1 above may be disclosed in Korean Patent Application Publication No. 10-2009-0071005 which has been already filed by Applicants.

The server 150 may apply a different rate to the channel coding depending on the characteristics of video frame using an LDPC code. According to the length of packet and α (refer to the following description), the performance of LDPC code varies (refer to FIG. 9). Further, the importance of an encoded video frame varies with its type. That is, without I frame, P or B frame might be not decoded. Accordingly, a packet including I frame (the length of each packet differs from the length of the others) performs channel coding by applying an α value that makes sure decoding is surely to be done in the client terminal 100 (that is, more redundant bits are given thus allowing for stronger resistance to errors). For example, in the case of an I frame packet with a length of 800 bits, channel coding may be carried out with α applied with 2.7.

After the I-frame packet has undergone channel coding, the P frame packet is subjected to channel coding by applying α according to Equation 2 (refer to Equation 4).

$$\alpha_P = \frac{\alpha \sum_{i=1}^{N} L_i - \sum_{i=1}^{k} \alpha_i^I L_i^I}{\sum_{i=k+1}^{N} L_i^P}$$

[Equation 2]

Meanwhile, in Equation 1 above, $R^{OP}$ refers to an operational rate. All the channel codes that presently exist have a lower performance than the channel capacity. Accordingly, a drop in performance may happen depending on the performance of channel code, and this applies α as in the following Equation 3. In the case of an ideal channel code, α=1. Normally, a is about 2.0 or more.

$$R^{op} = 1 - \alpha \cdot H(\varepsilon) \cdot 1 \leq \alpha \leq \frac{1}{H(\varepsilon)} \qquad \text{[Equation 3]}$$

Meanwhile, a total of redundant bits are calculated through Equation 1, and this may be reorganized as follows.

$$\alpha \cdot H(\varepsilon) \cdot \sum_{i=1}^{n} L_i = H(\varepsilon) \cdot \sum_{i=1}^{k} \alpha_i^I L_i^I + \alpha_p \cdot H(\varepsilon) \cdot \sum_{i=k+1}^{n} L_i^P \qquad \text{[Equation 4]}$$

In a terminal according to the present invention, a video quality result ($OPRA_{CLDS}$) is shown in Table 3. $ORPA_{CON}$ refers to the performance of a current 802.11b protocol. According to the present invention, video quality may be enhanced by up to 6 dB or more.

TABLE 7

| Phy (Mbps) | Xmit Rate (Kbps) | Operational Channel (PSNR-dB) | $ORPA_{CLDS}$ (dB) | $ORPA_{CON}$ (dB) |
|---|---|---|---|---|
| 2 | 500 | 28.96 | 27.67 | 27.81 |
|  | 750 | 31.02 | 30.74 | 30.78 |
|  | 900 | 31.93 | 31.51 | 31.25 |
|  | 1024 | 32.52 | 32.43 | 32.31 |
|  | avg | 31.11 | 30.59 | 30.53 |
| 5.5 | 500 | 29.00 | 27.92 | 28.23 |
|  | 750 | 30.88 | 29.39 | 29.84 |
|  | 900 | 31.90 | 30.78 | 29.98 |
|  | 1024 | 32.47 | 32.38 | 30.95 |
|  | avg | 31.06 | 30.11 | 29.75 |
| 11 | 500 | 29.00 | 27.59 | 25.22 |
|  | 750 | 30.88 | 29.59 | 30.18 |
|  | 900 | 31.78 | 30.67 | 22.73 |
|  | 1024 | 31.99 | 30.12 | 15.01 |
|  | avg | 30.91 | 29.47 | 23.28 |

Table 7 shows a rate adaptation performance comparison in terms of video quality in dB.

In Table 7, Xmit Rate means the transmit rate of video data, Operation channel refers to the maximum PSNR value that may be actually obtained when video channel is transmitted, $ORPA_{CLDS}$ refers to a performance obtained when a protocol estimating a channel condition is applied using side information including signal strength information according to an embodiment of the present invention, and ORPACON refers to a performance obtained when a conventional WLAN 802.11b protocol is applied (where, ORPA stands for Optimal Rate Prediction Architecture). Referring to Table 7, in case the physical data rate is low (in case of 2 or 5.5 Mbps), when referring to the performance in the case the average transmit rate of Table 3, it is shown that as compared with the conventional ORPACON performance (30.63 dB, 29.75 dB), the ORPACLDS performance (30.69 dB, 30.11 dB) according to an embodiment of the present invention does not show a major difference. However, in case the physical data rate is high to 11 Mbps, when referring to the performance in case of the average transmit rate (avg) in Table 1, it can be seen that as compared with the conventional ORPACON performance (23.28 dB), the ORPACLDS performance (29.47 dB) according to an embodiment of the present invention shows a major difference, 6 dB or more. Accordingly, it can be seen that performance has been greatly enhanced.

Although embodiments of the present invention have been described, it would be apparent to those of ordinary skill in the art that various changes or modifications may be made thereto without departing from the scope of the invention as defined in the appended claims.

The invention claimed is:

1. An apparatus of receiving multimedia, the apparatus comprising:
a message generator configured to generate a message including an indicator indicating a layer where a bit error rate is generated among a plurality of different layers including at least one of a physical (PHY) layer and an MAC (Media Access Control) layer,
wherein the message generator is implemented in a processor, and
wherein a sign of the indicator value represents whether the layer where the bit error rate is generated is the physical layer or the MAC layer.

2. The apparatus of claim 1,
wherein the message further includes a parameter indicating the bit error rate, and
wherein the indicator indicating the layer where the bit error rate is generated belongs to part of the parameter indicating the bit error rate.

3. The apparatus of claim 1, further comprising:
a transmitter configured to transmit the indicator indicating the layer where the bit error rate is generated and the generated bit error rate to a transmitting apparatus or to transmit a channel condition to the transmitting apparatus,
wherein the channel condition is generated using the indicator indicating the layer where the bit error rate is generated and the bit error rate.

4. The apparatus of claim 1, wherein the indicator indicating the layer where the bit error rate is generated is delivered between layers of a receiving apparatus through a cross layer interface (CLI).

5. An apparatus of transmitting multimedia, the apparatus comprising:
a message receiver configured to receive a message including an indicator indicating a layer where a bit error rate is generated among a plurality of different layers including at least one of a physical (PHY) layer and an MAC (Media Access Control) layer, and
wherein a sign of the indicator value represents whether the layer where the bit error rate is generated is the physical layer or the MAC layer.

6. The apparatus of claim 5, wherein the bit error rate is estimated and generated using side information in the plurality of different layers including at least one of the PHY layer and the MAC layer.

7. The apparatus of claim 6, wherein the side information includes at least one of a signal strength, modulation information, and ambient wireless traffic information.

8. The apparatus of claim 5, further comprising:
an MFU receiver configured to receive a media fragment unit (MFU) having a format independent from a specific media codec from a media codec layer;
an MPU generator configured to generate a media processing unit (MPU) using the media fragment unit (MFU);
an MMT asset generator configured to generate a Moving Pictures Experts Group (MPEG) Media Transport (MMT) asset by encapsulating the generated media processing unit (MPU);

an MMT package generator configured to generate an MMT package by encapsulating the generated MMT asset;
an MMT payload generator configured to receive the generated MMT package and to generate an MMT payload; and
an MMT transmission packet generator configured to generate an MMT transmission packet using the generated MMT payload,
wherein the MFU receiver, the MPU generator, the MMT asset generator, the MMT package generator, the MMT payload generator and the MMT transmission packet generator are implemented in the processor.

9. The apparatus of claim 5, further comprising:
a selector configured to select a coding rate by performing rate control on media data to be transmitted based on the bit error rate in the received message,
wherein the selector is implemented in the processor.

10. An apparatus of estimating a channel condition using a bit error rate, the apparatus comprising:
a BER generator configured to generate the bit error rate (BER) using side information among a plurality of different layers including at least one of a physical layer and an MAC layer; and
a transmitter configured to include the bit error rate and an indicator indicating a layer where the generated bit error rate is generated in a message and to transmit the message to another layer,
wherein the BER generator is implemented in a processor, and
wherein a sign of the indicator value represents whether the layer where the bit error rate is generated is the physical layer or the MAC layer.

* * * * *